United States Patent [19]

Watanabe

[11] Patent Number: 5,689,393
[45] Date of Patent: Nov. 18, 1997

[54] MAGNETIC DISK CARTRIDGE HAVING AN OPENING FOR A MAGNETIC HEAD ON A SIDE THEREOF

[75] Inventor: Seiichi Watanabe, Kanagawa-ken, Japan

[73] Assignees: Fuji Photo Film Co., Ltd., Tokyo, Japan; Iomega Corporation, Roy, Utah

[21] Appl. No.: 560,649

[22] Filed: Nov. 20, 1995

[30] Foreign Application Priority Data

Jan. 25, 1995 [JP] Japan ..................... 7-010061

[51] Int. Cl.$^6$ ............................ G11B 23/03
[52] U.S. Cl. ............................ 360/133
[58] Field of Search ................. 360/133, 132; 369/291; 242/347.1

[56] References Cited

U.S. PATENT DOCUMENTS

| | | | |
|---|---|---|---|
| 4,045,821 | 8/1977 | Fujikura | 360/132 |
| 4,455,642 | 6/1984 | Inaba | 369/291 |
| 4,614,270 | 9/1986 | Oishi | 360/132 |
| 4,620,254 | 10/1986 | Smith, II | 360/132 |
| 5,216,558 | 6/1993 | Griffith et al. | 360/99.06 |
| 5,218,503 | 6/1993 | Martin | 360/133 |
| 5,515,358 | 5/1996 | Goto | 369/291 |

FOREIGN PATENT DOCUMENTS

WO 89/08312  9/1989  WIPO ..................... 360/133

*Primary Examiner*—Stuart S. Levy
*Assistant Examiner*—David D. Davis
*Attorney, Agent, or Firm*—Sughrue,Mion,Zinn,Macpeak & Seas, PLLC

[57] ABSTRACT

A magnetic disk cartridge comprises a cassette shell and a magnetic disk, which is incorporated in the cassette shell such that it can rotate. The cassette shell is provided with an opening for insertion of a magnetic head, through which the magnetic head for magnetically recording and reproducing signals is to be inserted from the exterior such that the magnetic head can be brought into contact with the surfaces of the magnetic disk or can be brought to positions close to the surfaces of the magnetic disk. The opening for insertion of the magnetic head is formed in a side surface of the cassette shell, which side surface is parallel to an axis of rotation of the magnetic disk. A shutter member for opening and closing the opening for insertion of the magnetic head by moving along the side surface of the cassette shell is located only in the side surface of the cassette shell.

6 Claims, 4 Drawing Sheets

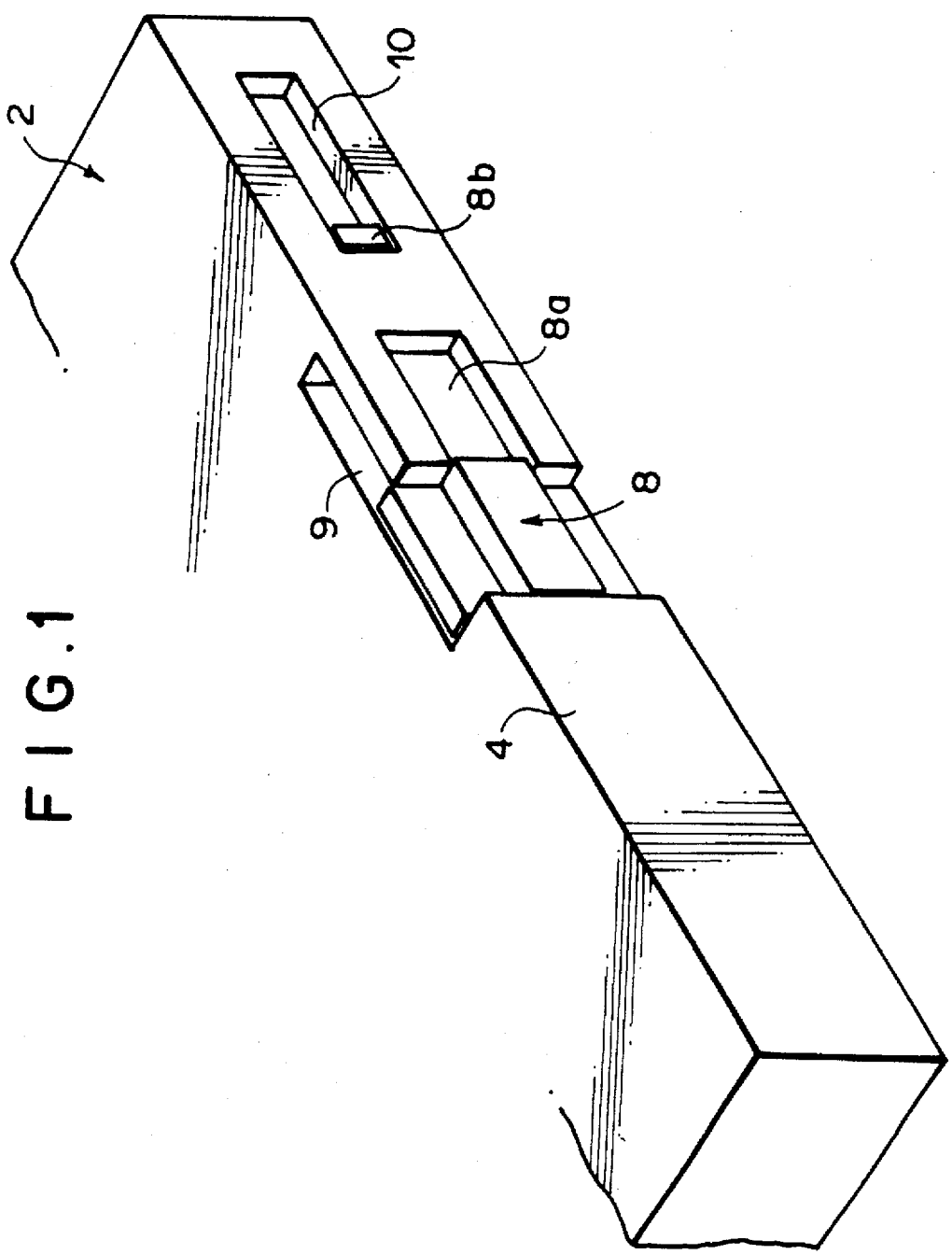

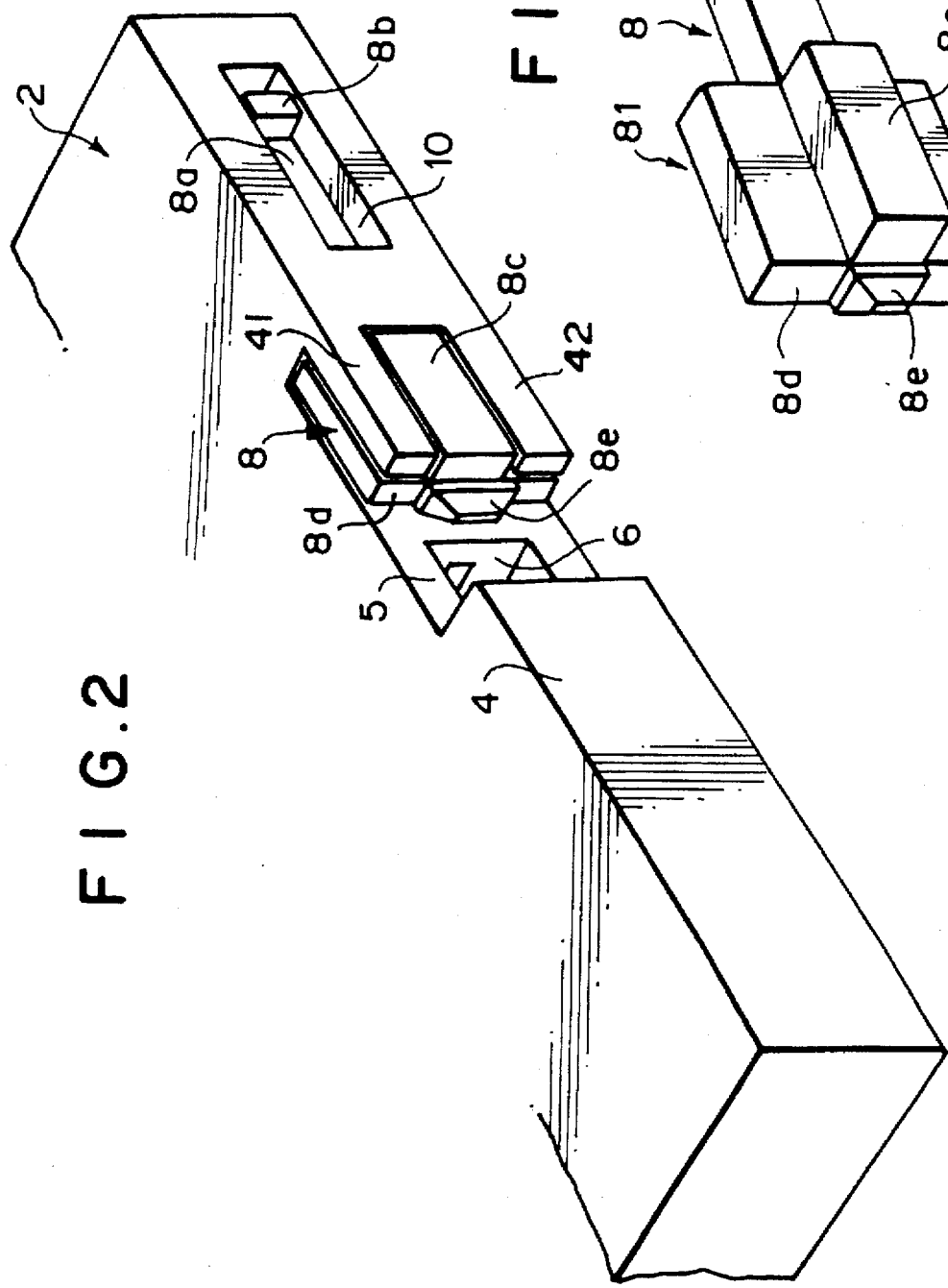
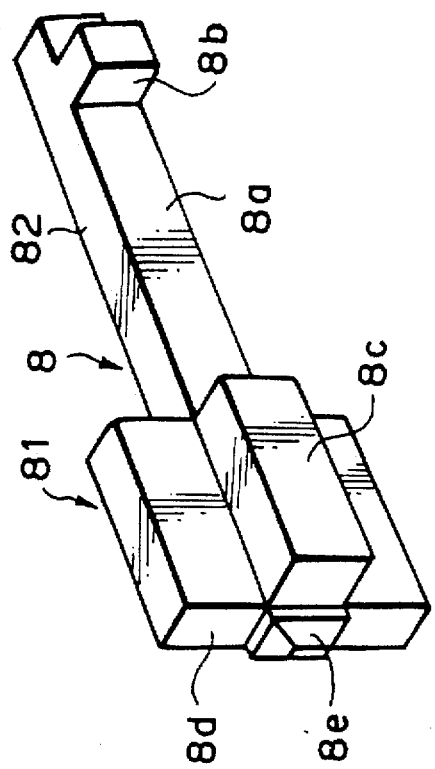

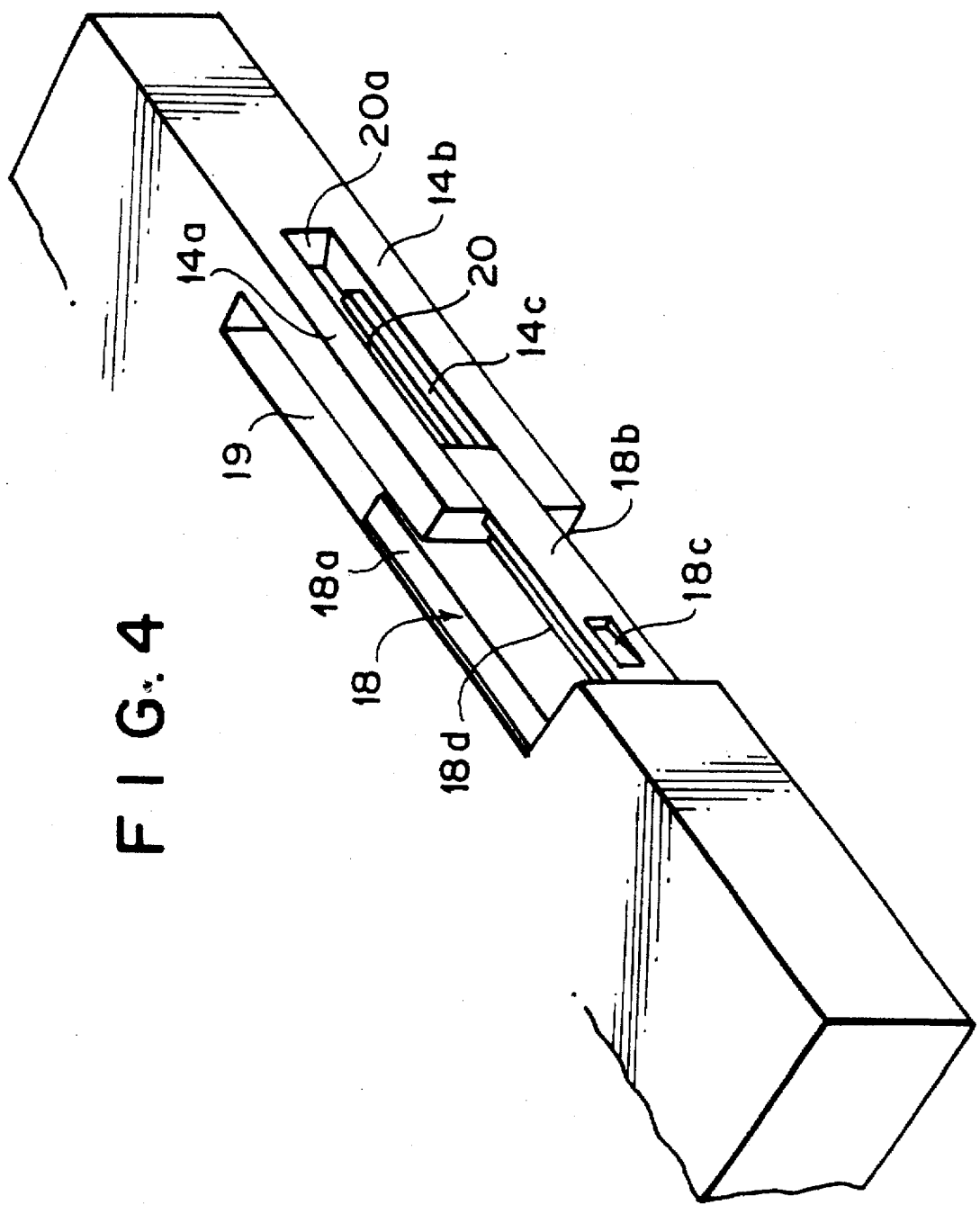

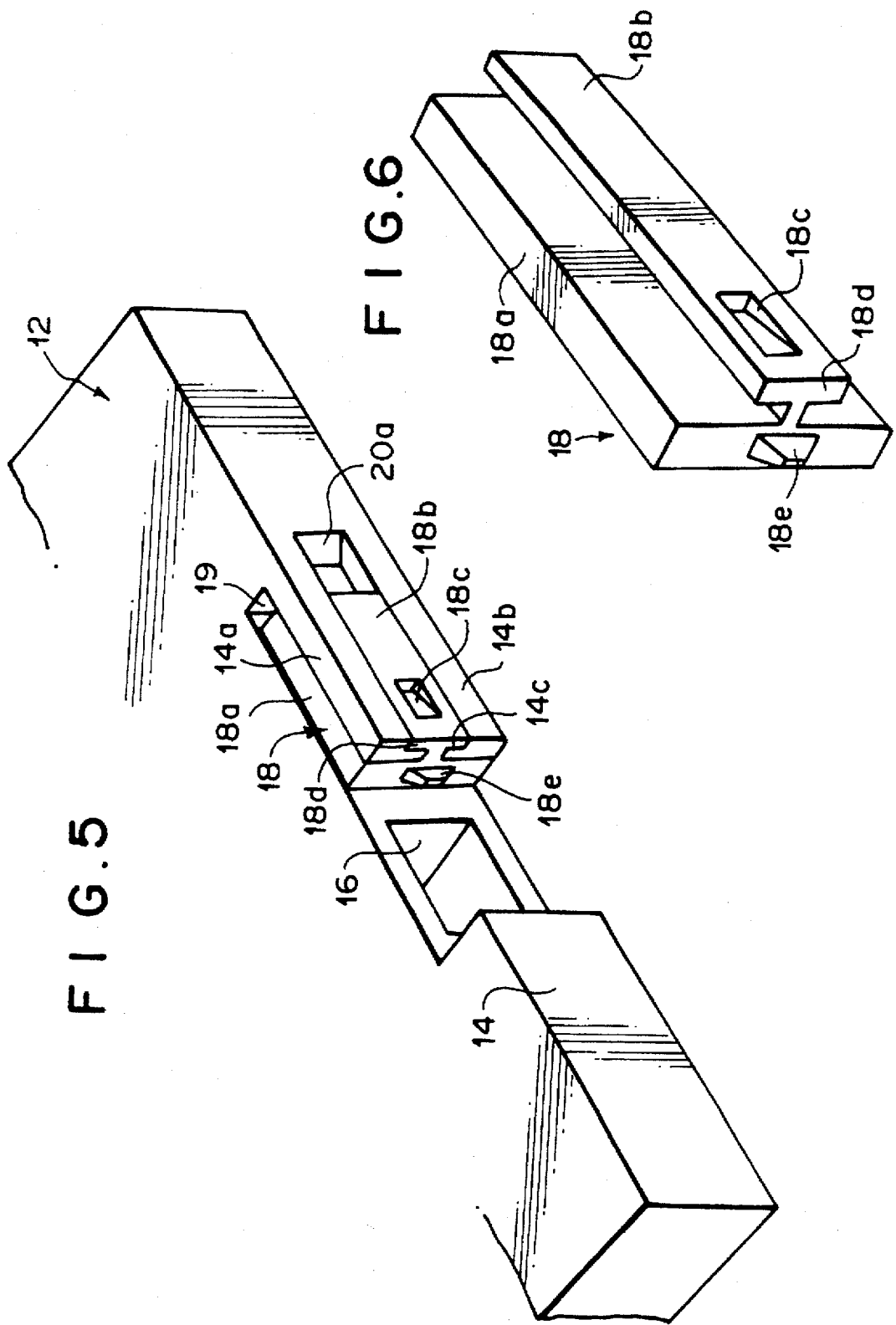

MAGNETIC DISK CARTRIDGE HAVING AN OPENING FOR A MAGNETIC HEAD ON A SIDE THEREOF

BACKGROUND OF THE INVENTION

1. Field of the Invention

This invention relates to a magnetic disk cartridge. This invention particularly relates to a magnetic disk cartridge comprising a cassette shell and a magnetic disk, which is incorporated in the cassette shell such that it can rotate.

2. Description of the Prior Art

Magnetic disk cartridges comprise a thin type of cassette shell and a magnetic disk, which is incorporated in the cassette shell such that it can rotate and on which analog or digital signals are to be recorded magnetically. The cassette shell takes on the form of a flat prismatic (approximately square) shape and comprises a top surface having an area slightly larger than the area of the magnetic disk, a bottom surface having an opening, through which a center core for supporting the center of the magnetic disk is exposed to the exterior, and a side surface having a narrow width and extending between the periphery of the top surface and the periphery of the bottom surface. The magnetic disk cartridge is provided with openings for insertion of a magnetic head, through which the magnetic head for magnetically recording and reproducing signals is to be inserted from the exterior such that the magnetic head can be brought into contact with the surfaces of the magnetic disk or can be brought to positions close to the surfaces of the magnetic disk. Also, the magnetic disk cartridge is provided with a shutter for opening and closing the openings for insertion of the magnetic head. When the magnetic disk cartridge is not used, the shutter closes the openings for insertion of the magnetic head such that dust, debris, or the like, may not enter into the magnetic disk cartridge.

In the conventional magnetic disk cartridges, the openings for insertion of the magnetic head are respectively formed in the top surface and the bottom surface of the cassette shell. The openings for insertion of the magnetic head have an elongated, approximately rectangular shape and extend in the radial direction of the magnetic disk. The shutter member for opening and closing the openings for insertion of the magnetic head is constituted of a thin metal sheet having a U-shaped cross-section and extending along both of the top surface and the bottom surface of the cassette shell and along the side surface of the cassette shell between its top and bottom surfaces. Shallow recesses for receiving and guiding the shutter member are formed as step-like portions on the top surface and the bottom surface of the cassette shell.

The openings for insertion of the magnetic head need not necessarily be formed in the top surface and the bottom surface of the cassette shell such that the openings may extend in the radial direction of the magnetic disk. In so far as an opening for insertion of the magnetic head has a shape such that the magnetic head can be brought into contact with the surfaces of the magnetic disk over the entire radius thereof or can be brought to positions close to the surfaces of the magnetic disk over the entire radius thereof, the opening for insertion of the magnetic head may be located at any position. Such that dust, debris, or the like, can be prevented from entering into the magnetic disk cartridge, the area of the opening for insertion of the magnetic head should be as small as possible. As it has become possible to reduce the size of the magnetic head, the degree of freedom of the selection of the location and the size of an opening for insertion of the magnetic head has been increased, and, such that the aforesaid requirements may be satisfied, instead of the openings for insertion of the magnetic head being formed in the top surface and the bottom surface of the cassette shell, it has become possible to form an opening for insertion of the magnetic head only in the side surface of the cassette shell. Specifically, it has become possible to form an opening for insertion of the magnetic head in the narrow-width side surface of the cassette shell, which opening has a size large enough to provide access to the surfaces of the magnetic disk from the exterior. In such cases, a thin arm-like pickup having a leading end, to which a small magnetic head is secured, is inserted through the opening for insertion of the magnetic head and moved in the radial direction of the magnetic disk in order to record signals on the magnetic disk or to reproduce signals from the magnetic disk.

It is possible to locate the same shutter as the shutter, which is utilized for the conventional magnetic disk cartridge, on the magnetic disk cartridge provided with the opening for insertion of the magnetic head in the side surface. However, in the conventional magnetic disk cartridge, the thicknesses of the primary walls of the cassette shell are thin due to the formation of the shallow recesses for receiving and guiding the shutter member, which recesses are formed as step-like portions on the top surface and the bottom surface of the cassette shell. Therefore, in cases where the constitution of the shutter of the conventional magnetic disk cartridge is employed directly for the magnetic disk cartridge, which is provided with the opening for insertion of the magnetic head in the side surface, the thicknesses of the primary walls of the cassette shell become very thin in the region in which the opening for insertion of the magnetic head is formed in the side surface of the cassette shell. As a result, the opening for insertion of the magnetic head is apt to deform during the molding of the cassette shell or during its use, and the strength of the cassette shell is degraded. If the opening for insertion of the magnetic head is deformed, there will be the risk that the shutter fitted for a sliding movement on the cassette shell cannot slide smoothly and cannot be opened and closed smoothly.

SUMMARY OF THE INVENTION

The primary object of the present invention is to provide a magnetic disk cartridge, wherein an opening for insertion of a magnetic head is not apt to deform, a cassette shell of the magnetic disk cartridge has a sufficient strength, and therefore a shutter fitted for a sliding movement on the cassette shell is always capable of sliding smoothly.

Another object of the present invention is to provide a magnetic disk cartridge, wherein a small opening for insertion of a magnetic head is formed such that dust, debris, or the like, may be prevented from entering into the magnetic disk cartridge.

The present invention provides a magnetic disk cartridge comprising a cassette shell and a magnetic disk, which is incorporated in the cassette shell such that it can rotate, wherein the cassette shell is provided with an opening for insertion of a magnetic head, through which the magnetic head for magnetically recording and reproducing signals is to be inserted from the exterior such that the magnetic head can be brought into contact with the surfaces of the magnetic disk or can be brought to positions close to the surfaces of the magnetic disk, the opening for insertion of the magnetic head being formed in a side surface of the cassette shell, which side surface is parallel to an axis of rotation of the magnetic disk, and a shutter member for opening and closing the opening for insertion of the magnetic head by moving along the side surface of the cassette shell is located only in the side surface of the cassette shell.

In the magnetic disk cartridge in accordance with the present invention, the opening for insertion of the magnetic head is formed in the side surface of the cassette shell. This means that, instead of the opening for insertion of the magnetic head being formed in the top surface or the bottom surface of the cassette shell, the opening for insertion of the magnetic head is formed only in the side surface of the cassette shell. Also, in the magnetic disk cartridge in accordance with the present invention, the shutter member is located only in the side surface of the cassette shell. This means that the shutter member does not project from the side surface of the cassette shell so as to cover a portion of the top surface or the bottom surface of the cassette shell.

Specifically, for example, a recess is formed in the side surface of the cassette shell such that the recess may include the region of the opening for insertion of the magnetic head, and the shutter member is located in the recess such that the shutter member can slide in the recess.

Also, for example, a guide slot is located which communicates with the recess and which extends on the side inward from the side surface of the cassette shell and along the side surface of the cassette shell, and a portion of the shutter member, which is located in the recess such that the shutter member can slide in the recess, is fitted into the guide slot such that the portion of the shutter member can slide in the guide slot.

Further, a long hole may be formed in a portion of a region of the side surface of the cassette shell which covers the guide slot. Part of the portion of the shutter member, which is fitted into the guide slot such that it can slide in the guide slot, may be exposed through the long hole to the exterior, and an engagement protrusion to be operated from the exterior may be formed on the part of the portion of the shutter member which is exposed through the long hole to the exterior.

Furthermore, the engagement protrusion may be constituted such that, when the shutter member is located at a position which closes the opening for insertion of the magnetic head, the engagement protrusion may be located at an end of the long hole, and the shutter member may thereby be prevented from being operated carelessly by a foreign body from the exterior.

Moreover, a guide member having a guide groove and extending in a direction, along which the shutter member slides, may be located at the side surface of the cassette shell and at a spacing from the surface of the recess, and a portion of the shutter member may be engaged with the guide groove of the guide member such that the portion of the shutter member, which is engaged with the guide groove of the guide member, can slide along the guide groove of the guide member.

In such a case, the portion of the shutter member, which is engaged with the guide groove of the guide member, may be exposed through the guide groove of the guide member to the exterior, and an engagement hole to be operated from the exterior may be formed in the portion of the shutter member, which is exposed through the guide groove of the guide member to the exterior.

With the magnetic disk cartridge in accordance with the present invention, the opening for insertion of a magnetic head, through which the magnetic head for magnetically recording and reproducing signals is to be inserted from the exterior such that the magnetic head can be brought into contact with the surfaces of the magnetic disk or can be brought to positions close to the surfaces of the magnetic disk, is formed in the side surface of the cassette shell. Also, the shutter member for opening and closing the opening for insertion of the magnetic head by moving along the side surface of the cassette shell is located only in the side surface of the cassette shell. Therefore, the size of the opening for insertion of the magnetic head can be kept small, and dust, debris, or the like, can be efficiently prevented from entering into the magnetic disk cartridge. Further, since the shutter member is located only in the side surface of the cassette shell, it is not necessary for shallow recesses for guiding a shutter member to be formed as step-like portions on the top surface and the bottom surface of the cassette shell. Therefore, the thickness of the primary wall of the cassette shell can be kept large. Accordingly, the opening for insertion of the magnetic head is not apt to deform, and the cassette shell of the magnetic disk cartridge can have a sufficient strength. As a result, the shutter member fitted for a sliding movement on the cassette shell is always capable of sliding smoothly.

By way of example, as a structure of the magnetic disk cartridge in accordance with the present invention, the recess is formed in the side surface of the cassette shell such that the recess may include the region of the opening for insertion of the magnetic head, and the shutter member is located in the recess such that the shutter member can slide in the recess. Also, the guide slot is located which communicates with the recess and which extends on the side inward from the side surface of the cassette shell and along the side surface of the cassette shell, and a portion of the shutter member, which is located in the recess such that the shutter member can slide in the recess, is fitted into the guide slot such that the portion of the shutter member can slide in the guide slot. In this manner, with a simple structure, the shutter member can be located only in the side surface of the cassette shell.

Further, the long hole may be formed in a portion of the region of the side surface of the cassette shell, which region covers the guide slot. Part of the portion of the shutter member, which portion is fitted into the guide slot such that it can slide in the guide slot, may be exposed through the long hole to the exterior. Also, the engagement protrusion to be operated from the exterior may be formed on the part of the portion of the shutter member, which part is exposed through the long hole to the exterior. In such cases, the engagement protrusion can be constituted such that, when the shutter member is located at a position which closes the opening for insertion of the magnetic head, the engagement protrusion may be located at an end of the long hole. In this manner, the shutter member can be prevented from being operated carelessly by a foreign body from the exterior.

Moreover, the guide member having the guide groove and extending in the direction, along which the shutter member slides, may be located at the side surface of the cassette shell and at a spacing from the surface of the recess. A portion of the shutter member may be engaged with the guide groove of the guide member such that the portion of the shutter member, which is engaged with the guide groove of the guide member, can slide along the guide groove of the guide member. Also, the portion of the shutter member, which is engaged with the guide groove of the guide member, may be exposed through the guide groove of the guide member to the exterior. In such cases, the engagement hole to be operated from the exterior can be formed in the portion of the shutter member, which is exposed through the guide groove of the guide member to the exterior.

In each of the aforesaid structures of the magnetic disk cartridge in accordance with the present invention, an urging means may be located which urges the shutter member towards the direction that closes the opening for insertion of the magnetic head. In this manner, the shutter member can be prevented from being opened carelessly when the magnetic disk cartridge is not used.

BRIEF DESCRIPTION OF THE DRAWINGS

FIG. 1 is a perspective view showing part of a first embodiment of the magnetic disk cartridge in accordance with the present invention in the state in which a shutter is closed, FIG. 2 is a perspective view showing the part of the first embodiment of the magnetic disk cartridge in accordance with the present invention in the state in which the shutter is opened, FIG. 3 is a perspective view showing the shutter in the first embodiment of the magnetic disk cartridge in accordance with the present invention, FIG. 4 is a perspective view showing part of a second embodiment of the magnetic disk cartridge in accordance with the present invention in the state in which a shutter is closed, FIG. 5 is a perspective view showing the part of the second embodiment of the magnetic disk cartridge in accordance with the present invention in the state in which the shutter is opened, and FIG. 6 is a perspective view showing the shutter in the second embodiment of the magnetic disk cartridge in accordance with the present invention.

DESCRIPTION OF THE PREFERRED EMBODIMENTS

The present invention will hereinbelow be described in further detail with reference to the accompanying drawings.

FIG. 1 is a perspective view showing part of a first embodiment of the magnetic disk cartridge in accordance with the present invention in the state in which a shutter is closed. FIG. 2 is a perspective view showing the part of the first embodiment of the magnetic disk cartridge in accordance with the present invention in the state in which the shutter is opened. FIG. 3 is a perspective view showing the shutter in the first embodiment of the magnetic disk cartridge in accordance with the present invention.

A cassette shell 2 incorporates therein a magnetic disk (not shown) such that the magnetic disk can rotate. As in a conventional magnetic disk cartridge, the cassette shell 2 comprises upper and lower cassette shell halves, which are formed with a plastic molding process (a splice line between the upper and lower cassette shell halves is not shown). As illustrated in FIG. 2, the cassette shell 2 is provided with an opening 6 for insertion of a magnetic head, through which the magnetic head for magnetically recording and reproducing signals is to be inserted from the exterior such that the magnetic head can be brought into contact with the surfaces of the magnetic disk or can be brought to positions close to the surfaces of the magnetic disk. The opening 6 for insertion of the magnetic head is formed in a side surface 4 of the cassette shell 2, which side surface is parallel to an axis of rotation of the magnetic disk. A shutter 8 for opening and closing the opening 6 for insertion of the magnetic head by moving along the side surface 4, which is provided with the opening 6 for insertion of the magnetic head, is located only in the side surface 4 of the cassette shell 2.

A recess 5 is formed in the side surface 4 of the cassette shell 2 such that the recess 5 may include the region of the opening 6 for insertion of the magnetic head. The shutter 8 is located in the recess 5 such that the shutter 8 can slide in the recess 5. Also, a guide slot is located which communicates with the recess 5 and which extends on the side inward from the side surface 4 of the cassette shell 2 and along the side surface 4 of the cassette shell 2. (In FIG. 2, the guide slot is located on the side inward from a long hole 10, which will be described later, and is not shown). A portion (i.e., an extension 82 shown in FIG. 3) of the shutter 8, which is located in the recess 5 such that the shutter 8 can slide in the recess 5, is fitted into the guide slot such that the portion of the shutter 8 can slide in the guide slot.

Further, the long hole 10 is formed in a portion of a region of the side surface 4 of the cassette shell 2, which covers the guide slot. A part 8a of the portion (i.e., the extension 82) of the shutter 8, is fitted into the guide slot such that it can slide in the guide slot and is exposed through the long hole 10 to the exterior. An engagement protrusion 8b to be operated from the exterior is formed on the part 8a of the portion (i.e., the extension 82) of the shutter 8 and part 8a is exposed through the long hole 10 to the exterior. The engagement protrusion 8b is constituted such that, when the shutter 8 is located at a position which closes the opening 6 for insertion of the magnetic head (i.e., at the position shown in FIG. 1), the engagement protrusion 8b may be located at an end of the long hole 10, and the shutter 8 may thereby be prevented from being operated carelessly by a foreign body from the exterior.

An upper guide member 41 and a lower guide member 42 are formed on the side forward from the recess 5, which is formed in the side surface 4 of the cassette shell 2 and in which the shutter 8 is located for a slide movement. The guide members 41 and 42 protrude from the side surface 4 of the cassette shell 2 and extend in the direction along which the shutter 8 slides in order to guide the shutter 8. As illustrated in FIG. 1, a space 9 for guiding the shutter 8 is formed between the pair of the guide members 41 and 42 and a portion of the recess 5 of the side surface 4 of the cassette shell 2.

As illustrated in FIG. 3, the shutter 8 comprises an approximately rectangular shutting section 81, which opens and closes the opening 6 for insertion of the magnetic head, and the extension 82, which is fitted for a sliding movement into the guide slot extending in the direction of the sliding movement of the shutter 8. The shutting section 81 is provided with a protuberance 8c at its middle portion. The protuberance 8c is guided by being sandwiched between the pair of the guide members 41 and 42, which are formed in the side surface 4 of the cassette shell 2 so as to extend in the direction of the sliding movement of the shutter 8. Also, a protrusion 8e is formed on a front end face 8d of the shutting section 81. The protrusion 8e is fitted into a shallow hole formed in the side face of the recess 5 of the cassette shell 2, which comes into contact with the front end face 8d of the shutter 8 when the shutter 8 is closed. (In the perspective view of FIG. 2, the side face of the recess 5 is behind the side surface 4 and cannot be seen.) By the fitting of the protrusion 8e into the shallow hole formed in the side face of the recess 5, when the shutter 8 is closed, the shutter 8 can be held reliably at the closed position.

The guide slot, into which the extension 82 of the shutter 8 is fitted for the sliding movement, may have any shape which allows the extension 82 to be fitted into the guide slot such that the extension 82 can slide in the guide slot. The guide slot and the space 9, in which the shutter 8 slides, are formed simultaneously when the pair of the cassette shell halves are formed by an integral molding process. When the pair of the cassette shell halves are combined and secured to each other, the shutter 8 can be inserted between the pair of the cassette shell halves, and the magnetic disk cartridge can thereby be assembled.

When the magnetic disk cartridge having the constitution described above is used, as in the conventional magnetic disk cartridge, the magnetic disk cartridge with its shutter 8 closed as shown in FIG. 1 is inserted and loaded into a magnetic recording and reproducing apparatus (hereinafter simply referred to as the apparatus). At this time, in accordance with the loading operation, the shutter 8 is opened to the open position shown in FIG. 2 by an operating member located on the apparatus side. When the magnetic disk cartridge is taken out of the apparatus, in accordance with the operation for taking out the magnetic disk cartridge from the apparatus, such as the operation for pushing an operating pushbutton of the apparatus, the shutter 8 is closed to the position shown in FIG. 1 by the operating member located on the apparatus side. As the mechanism on the apparatus for opening and closing the shutter 8, one of various types of mechanisms can be selected easily and appropriately.

In order to facilitate the operation for closing the shutter 8, an urging means (e.g., a spring), which urges the shutter 8 towards the closing direction, should preferably be located in the cassette shell 2. The urging means also serves to hold the shutter 8 at the closed position when the magnetic disk cartridge is not used and, therefore, is advantageous for preventing dust, debris, or the like, from entering into the magnetic disk cartridge. The aforesaid embodiment is constituted such that, when the shutter 8 is located at the position, which closes the opening 6 for insertion of the magnetic head as shown in FIG. 1, the engagement protrusion 8b may be located at one end of the long hole 10, and the shutter 8 may thereby be prevented from being operated carelessly by a foreign body from the exterior. However, in cases where the urging means described above is provided, the magnetic disk cartridge need not necessarily be constituted such that the engagement protrusion 8b may be located at one end of the long hole 10 when the shutter 8 is located at the closed position. In cases where the urging means described above is provided, the magnetic disk cartridge may be constituted such that the engagement protrusion 8b may be located at a position spaced from the one end of the long hole 10 when the shutter 8 is located at the closed position, such that a recess may thereby be formed between the long hole 10 and the engagement protrusion 8b, and such that the operating member located on the apparatus may be engaged with the thus formed recess. In such cases, it becomes easy to design the operating member located on the apparatus and the mechanism for driving the operating member.

A second embodiment of the magnetic disk cartridge in accordance with the present invention will be described hereinbelow with reference to FIGS. 4, 5, and 6.

FIG. 4 is a perspective view showing part of the second embodiment of the magnetic disk cartridge in accordance with the present invention in the state in which a shutter is closed. FIG. 5 is a perspective view showing the part of the second embodiment of the magnetic disk cartridge in accordance with the present invention in the state in which the shutter is opened. FIG. 6 is a perspective view showing the shutter in the second embodiment of the magnetic disk cartridge in accordance with the present invention.

In the second embodiment, a space 19, in which a shutter 18 is guided for a sliding movement (and which corresponds to the guide slot or the space 9 in the first embodiment), is formed in a side surface 14 of a cassette shell 12. A lateral hole 20 is formed in a portion of the side surface 14 which covers the space 19. The lateral hole 20 communicates with the space 19 and extends along the space 19. A dovetail guide groove 14c is formed in the lateral hole 20. A T-shaped protruding strip 18d, which constitutes a portion of the shutter 18 fitted for the sliding movement into the space 19, is engaged with the dovetail guide groove 14c such that the T-shaped protruding strip 18d can along the dovetail guide groove 14c. A surface 18b of the T-shaped protruding strip 18d is exposed through the dovetail guide groove 14c to the exterior. An engagement hole 18c to be operated from the exterior is formed in the surface 18b of a portion of the shutter 18, which surface 18b is exposed through the dovetail guide groove 14c to the exterior.

Also in this embodiment, the shutter 18 for opening and closing an opening 16 for insertion of the magnetic head by moving along the side surface 14, which is provided with the opening 16 for insertion of the magnetic head, is located only in the side surface 14 of the cassette shell 12. A recess is formed in the side surface 14 of the cassette shell 12 such that the recess may include the region of the opening 16 for insertion of the magnetic head. The recess communicates with the space 19. The shutter 18 is located in the recess and the space 19 such that the shutter 18 can slide in the recess and the space 19.

An upper guide member 14a and a lower guide member 14b are formed at the space 19, in which the shutter 18 is located for a slide movement. The pair of the guide members 14a and 14b protrude from the side surface 14 of the cassette shell 12 and extend in the direction along which the shutter 18 slides in order to guide the shutter 18. The dovetail guide groove 14c for guiding the T-shaped protruding strip 18d of the shutter 18 is formed in the lateral hole 20, which is formed between the pair of the guide members 14a and 14b.

As illustrated in FIG. 6, the shutter 18 comprises an approximately rectangular shutting section 18a, which opens and closes the opening 16 for insertion of the magnetic head, and the T-shaped protruding strip 18d, which is formed at the middle portion of the shutting section 18a and combined with the shutting section 18a into an integral body. The T-shaped protruding strip 18d extends in the direction of the sliding movement of the shutter 18. Also, a protrusion 18e is formed on a front end face of the shutting section 18a. The protrusion 18e is fitted into a shallow hole formed in the side face of the recess of the cassette shell 12 which comes into contact with the front end face of the shutter 18 when the shutter 18 is closed. (In the perspective view of FIG. 5, the side face of the recess is behind the side surface 14 and cannot be seen.)

The space 19 is formed simultaneously when the cassette shell 12 is formed by an integral molding process. When a pair of the cassette shell halves are combined and secured to each other, the shutter 18 can be inserted between the pair of the cassette shell halves, and the magnetic disk cartridge can thereby be assembled.

When the magnetic disk cartridge having the constitution described above is used, the magnetic disk cartridge with its shutter 18 closed as shown in FIG. 4 is inserted and loaded into the apparatus. At this time, in accordance with the loading operation, the shutter 18 is opened to the open position shown in FIG. 5 by an operating member located on the apparatus. When the magnetic disk cartridge is taken out of the apparatus, in accordance with the operation for taking out the magnetic disk cartridge from the apparatus, such as the operation for pushing an operating pushbutton of the apparatus, the shutter 18 is closed to the position shown in FIG. 4 by the operating member located on the apparatus. In order for the operating member for opening and closing the shutter 18 to operate the shutter 18, the engagement hole 18c may be utilized. Also, such that the shutter 18 can be easily operated towards the closing direction, the length of the lateral hole 20 may be set to be longer than the length of the T-shaped protruding strip 18d such that, when the shutter 18 is opened as shown in FIG. 5, a cavity 20a may be formed between an end of the lateral hole 20 and an end of the T-shaped protruding strip 18d. The operating member on the apparatus may be fitted into the cavity 20a such that the operating member can easily move the shutter 18 towards the closing direction.

As the mechanism on the apparatus for opening and closing the shutter 18, one of various types of mechanisms can be selected easily and appropriately.

Also in this embodiment, an urging means (e.g., a spring), which urges the shutter 18 towards the closing direction, should preferably be located in the cassette shell 12.

In the first embodiment described above, such that the shutter 8 may be held reliably at the open position, a protrusion and a hole for click stop, which engage with each other, may be located respectively on the inner side face of the shutter 8 and the outer side face of the cassette shell 2, which are in contact with each other. Also, in the second embodiment described above, such that the shutter 18 may be held reliably at the open position, a protrusion and a hole for click stop, which engage with each other, may be located respectively on the inner side face of the shutter 18 and the outer side face of the cassette shell 12, which are in contact with each other. In this manner, the degree of freedom of the design of the operating mechanism on the apparatus side can be enhanced.

What is claimed is:

1. A magnetic disk cartridge comprising a cassette shell and a magnetic disk, which is incorporated in the cassette shell such that it rotates, wherein the cassette shell is provided with an opening for insertion of a magnetic head, through which the magnetic head for magnetically recording and reproducing signals is to be inserted from the exterior such that the magnetic head is brought into contact with the surfaces of the magnetic disk or is brought to positions close to the surfaces of the magnetic disk, said opening for insertion of the magnetic head being formed in a side surface of the cassette shell, said side surface being parallel to an axis of rotation of the magnetic disk, and a shutter member for opening and closing said opening for insertion of the magnetic head by moving along said side surface of the cassette shell in a direction parallel to said side surface, said shutter member being located only in said side surface of the cassette shell, wherein a recess is formed in said side surface of the cassette shell, said recess including the region of said opening for insertion of the magnetic head, and said shutter member is located in said recess such that said shutter member slides in said recess, and further wherein a guide slot is located which communicates with said recess and which extends on the side inward from said side surface of the cassette shell and along said side surface of the cassette shell, and a portion of said shutter member, which is located in said recess such that said shutter member slides in said recess, is fitted into said guide slot such that said portion of said shutter member slides in said guide slot.

2. A magnetic disk cartridge as defined in claim 1 wherein a long hole is formed in a portion of a region of said side surface of the cassette shell, said region covers said guide slot, part of said portion of said shutter member, which is fitted into said guide slot such that it slides in said guide slot, is exposed through said long hole to the exterior, and an engagement protrusion to be operated from the exterior is formed on said part of said portion of said shutter member which is exposed through said long hole to the exterior.

3. A magnetic disk cartridge as defined in claim 2 wherein said engagement protrusion is constituted such that, when said shutter member is located at a position which closes said opening for insertion of the magnetic head, said engagement protrusion may be located at an end of said long hole, and said shutter member may thereby be prevented from being operated erroneously.

4. A magnetic disk cartridge as defined in claim 1 wherein an urging means is located which urges said shutter member towards the direction that closes said opening for insertion of the magnetic head.

5. A magnetic disk cartridge comprising a cassette shell and a magnetic disk, which is incorporated in the cassette shell such that it rotates, wherein the cassette shell is provided with an opening for insertion of a magnetic head, through which the magnetic head for magnetically recording and reproducing signals is to be inserted from the exterior such that the magnetic head is brought into contact with the surfaces of the magnetic disk or is brought to positions close to the surfaces of the magnetic disk, said opening for insertion of the magnetic head being formed in a side surface of the cassette shell, said side surface being parallel to an axis of rotation of the magnetic disk, and a shutter member for opening and closing said opening for insertion of the magnetic head by moving along said side surface of the cassette shell in a direction parallel to said side surface, said shutter member being located only in said side surface of the cassette shell, wherein a recess is formed in said side surface of the cassette shell, said recess including the region of said opening for insertion of the magnetic head, and said shutter member is located in said recess such that said shutter member slides in said recess, and further wherein a guide member having a guide groove and extending in a direction along which said shutter member slides, is located at said side surface of the cassette shell and at a spacing from the surface of said recess, and a portion of said shutter member is engaged with said guide groove of said guide member such that said portion of said shutter member, which is engaged with said guide groove of said guide member, slides along said guide groove of said guide member.

6. A magnetic disk cartridge as defined in claim 5 wherein said portion of said shutter member, which is engaged with said guide groove of said guide member, is exposed through said guide groove of said guide member to the exterior, and an engagement hole to be operated from the exterior is formed in said portion of said shutter member which is exposed through said guide groove of said guide member to the exterior.

* * * * *